(12) United States Patent
Valade et al.

(10) Patent No.: US 10,956,032 B2
(45) Date of Patent: Mar. 23, 2021

(54) KEYBOARD UTILITY FOR INPUTTING DATA INTO A MOBILE APPLICATION

(71) Applicant: Microsoft Technology Licensing, LLC, Redmond, WA (US)

(72) Inventors: Pierre Valade, New York, NY (US); Jeremy Le Van, Brooklyn, NY (US); Christophe Louis François Lamperti, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 385 days.

(21) Appl. No.: 14/926,283

(22) Filed: Oct. 29, 2015

(65) Prior Publication Data

US 2016/0124636 A1 May 5, 2016

Related U.S. Application Data

(60) Provisional application No. 62/072,068, filed on Oct. 29, 2014.

(51) Int. Cl.
*G06F 3/0481* (2013.01)
*G06F 3/0488* (2013.01)

(52) U.S. Cl.
CPC ........ *G06F 3/04886* (2013.01); *G06F 3/0481* (2013.01)

(58) Field of Classification Search
CPC .............................. G06F 3/0484; G06F 3/0481
See application file for complete search history.

(56) References Cited

U.S. PATENT DOCUMENTS

| | | | |
|---|---|---|---|
| 8,428,453 B1 | 4/2013 | Spiegel et al. | |
| 8,448,084 B2 | 5/2013 | Brichter | |
| 2010/0159967 A1* | 6/2010 | Pounds | H04L 67/325 455/466 |
| 2010/0323762 A1* | 12/2010 | Sindhu | G06F 1/1613 455/566 |
| 2011/0061017 A1* | 3/2011 | Ullrich | G06F 40/274 715/780 |
| 2012/0127080 A1* | 5/2012 | Kushler | G06F 3/04886 345/168 |
| 2013/0097549 A1* | 4/2013 | Park | G06F 3/04886 715/773 |

(Continued)

OTHER PUBLICATIONS

"Custom Keyboard;" App Extension Programming Guide; Nov. 2, 2015; 10 pages; https://developer.apple.com/library/mac/documentation/General/Conceptual/ExtensibilityPG/Keyboard.html.

(Continued)

*Primary Examiner* — Rayeez R Chowdhury

(57) ABSTRACT

Aspects of the present disclosure relate to systems and methods for inputting data into a primary application. A keyboard utility may be rendered on a user interface of a client computing device for inputting data into a primary application. Information may be obtained from a secondary application. A view may be generated using the information obtained from the secondary application. The view may be displayed as the keyboard utility on the user interface of the client computing device. In aspects, the keyboard utility is linked to the secondary application. In some cases, the secondary application is a calendar application.

20 Claims, 9 Drawing Sheets

(56) References Cited

U.S. PATENT DOCUMENTS

| | | | |
|---|---|---|---|
| 2013/0139092 A1* | 5/2013 | Hang | H04M 1/72519 715/773 |
| 2013/0234948 A1* | 9/2013 | Jian | G06F 3/0487 345/169 |
| 2014/0223372 A1* | 8/2014 | Dostie | G06F 3/0482 715/813 |
| 2014/0337628 A1* | 11/2014 | Amato | H04L 9/0825 713/171 |

OTHER PUBLICATIONS

Sarah Guarino; "iOS 8 How-to: Set up and customize third-party keyboards;" Oct. 26, 2014; 10 pages; http://9to5mac.com/2014/10/26/ios-8-customize-keyboards/.

"Autocorrect that Actually Works;" Nov. 2, 2015; 6 pages; https://swiftkey.com/en/keyboard/android.

* cited by examiner

KEYBOARD UTILITY FOR INPUTTING DATA INTO A MOBILE APPLICATION

RELATED APPLICATIONS

This applications claims the benefit of and priority to U.S. Provisional Patent Application No. 62/072,068, filed on Oct. 29, 2014, and entitled, "METHODS AND APPARATUS FOR GENERATING A DYNAMIC INPUT MODULE," which is hereby incorporated by reference in its entirety.

BACKGROUND

Conventionally, mobile devices (including but not limited to Personal Digital Assistants, tablets, mobile phones, and/or the like) which lack physical keyboards, provide users with on-screen keyboard applets. The keyboard applets allow users to input data into input fields, including but not limited to messages (e.g., emails, SMS messages, blog and/or social media posts, web forms, and/or the like).

Keyboard applets, however, often only allow users to input textual data and/or icons into these input fields. Users cannot use keyboard applets to input more complex data (such as non-textual data from mobile applications) into input fields. The input field, in conventional methods, must authorize the user to separately open the other mobile application, to link a user's account with the input field, and/or the like, to allow the user to input other forms of data. This can require users to switch between and submit data from a large number of applications to provide data to an input field. This can also limit the type of information a user can readily provide to an input field using the keyboard applet. Switching between applications is also time consuming and can cause loss of message drafts and other technical issues while retrieving data from other applications.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In summary, the present disclosure relates to systems and methods for inputting data into a mobile application. In aspects, a keyboard utility may be rendered on a user interface of a client computing device for inputting data into a primary application. Information may be obtained from a calendar application. A view may be generated using the information obtained from the calendar application. The view may be displayed as the keyboard utility on the user interface of the client computing device.

In other aspects, a keyboard utility may be rendered on a user interface. The keyboard utility may be linked to a secondary application, where the keyboard utility is a generated view of information associated with the secondary application. In response to receiving at least one input on the keyboard utility, data associated with the secondary application may be generated. The generated data may be input into the primary application.

DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Figure 1:
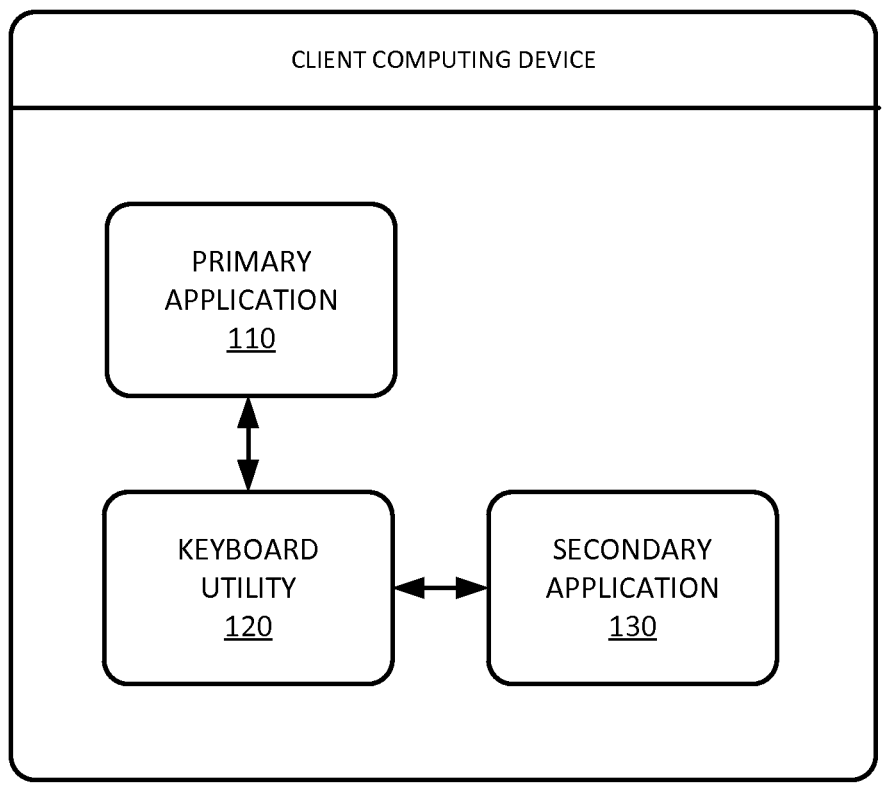
FIG. 1 illustrates a client computing device for inputting data into a mobile application using a keyboard utility, according to an example aspect.

Aspects of the disclosure are directed to inputting data associated with a calendar application into a mobile application using a keyboard utility that is linked to the calendar application. The mobile application may include any application suitable for implementation on a computing device and for communicating between computing devices (e.g., email applications, SMS messaging applications, Instant Messaging (IM) applications, social media applications, and the like). The mobile application may also be referred to as a primary application, as will be described herein. The keyboard utility may include a view generated using information obtained from a calendar application. In this regard, the view may be displayed as the keyboard utility. For example, the keyboard utility may appear like a calendar application and function like both a calendar application and a keyboard application. In this regard, in one example, a user of the mobile application may use the keyboard utility to schedule a meeting with another person. In one example, a date, time, and location may be selected on the keyboard utility. In one case, a selectable link (e.g., a Uniform Resource Locator) including this data (e.g., date, time, and location) may be inserted/input into an input field of the mobile application and sent, via the mobile application, to the person identified in a "To" field of the mobile application. Upon confirmation of the meeting request, a calendar application associated with the person identified in the "To" field of the mobile application may be updated to include the confirmed meeting. In another example, upon confirmation of the meeting request, a calendar application associated with the user of the mobile application may be updated to include the confirmed meeting. It is appreciated that while the example described above includes a single person for scheduling a meeting, a group of people may be included in the "To" field, for example, for scheduling a meeting with multiple invitees. As such, a calendar application of those invitees that confirm the meeting request will be updated to include the confirmed meeting.

As discussed above, current keyboard applications and/or methods for inputting data into a mobile application may require authorizing a user to separately open a second application, to link a user's account with an input field of the mobile application, and/or the like, to allow the user to input forms of data other than textual data (e.g., from a standard keyboard utility). In this regard, users may be required to switch between and submit data from a large number of applications to provide data to an input field of the mobile application. Standard keyboard applications may also limit the type of information a user can readily provide to an input field of a mobile application using the standard keyboard application. As such, current methods for inputting data associated with a secondary application into a mobile application may be time consuming, result in a loss of data (e.g., a draft message), and may create other technical issues while obtaining data from the secondary applications.

Accordingly, aspects described herein include displaying a view including information obtained from a secondary application (e.g., a calendar application) as a keyboard utility such that a user may directly input data associated with the secondary application into a mobile application without opening and/or activating the secondary application. In some cases, the view displayed as the keyboard utility partially overlaps the mobile application on the user interface such that both the mobile application and the view displayed as the keyboard utility are simultaneously viewable on the user interface. For example, while using the mobile application, the mobile application may occupy all the screen space on the user interface and the keyboard utility may be displayed on a lower portion of the user interface such that the keyboard utility overlaps a lower portion of the mobile application. In this regard, a user may view and/or interact with both the mobile application and the keyboard utility at the same time. In the example where the secondary application is a calendar application, the user may view and/or interact with both the mobile application and essentially the calendar application at the same time. In some cases, the keyboard utility and/or the secondary application may dynamically determine how much screen space on the user interface to occupy. As such, the keyboard utility and/or the secondary application may occupy as much screen space as necessary for a particular task being performed (e.g., scheduling a meeting). A technical effect that may be appreciated is that the keyboard utility of the present disclosure facilitates a compelling visual and functional experience to allow a user to efficiently interact with a user interface for inputting data associated with a secondary application into a mobile application.

As described herein, providing access to data in a secondary application via a keyboard utility without requiring opening and/or activating the secondary application may reduce copy and paste operations from a secondary application into the mobile application, may reduce switching between and inputting data from a large number of applications into an input field of a mobile application, and may facilitate efficient interaction with the user interface of a computing device (e.g., efficient interaction with the mobile application, keyboard utility, and/or secondary application). In turn, another technical effect that may be appreciated is that fewer computations may be required by a client and/or server computing device implementing the keyboard utility of the present disclosure.

Referring now to the drawings, in which like numerals represent like elements through the several figures, aspects of the present disclosure and the exemplary operating environment will be described. With reference to FIG. 1, one aspect of a client computing device 100 for inputting data associated with a secondary application into a mobile application using a keyboard utility is illustrated. In a basic configuration, the client computing device 100 is a handheld computer having both input elements and output elements. The client computing device may be any suitable computing device for implementing a keyboard utility for inputting data associated with a secondary application into a mobile application. For example, the client computing device may be at least one of: a mobile telephone; a smart phone; a tablet; a phablet; a smart watch; a wearable computer; a personal computer; a desktop computer; a laptop computer; a gaming device/computer (e.g., Xbox); a television; and etc. This list is exemplary only and should not be considered as limiting. Any suitable client computing device for implementing a keyboard utility for inputting data associated with a secondary application into a mobile application may be utilized.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an Intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

In aspects, as shown in FIG. 1, the client computing device 100 may include at least a primary application 110, a keyboard utility 120, and a secondary application 130. The various components described herein may be implemented using hardware, software, or a combination of hardware and software. The primary application 110 may be a mobile application, and may be any application or collection of applications, module or collection of modules, service or services, or any variation or combination thereof capable of facilitating sharing of content, communication, collaboration, conversations, and the like. Examples of the primary application 100 include email applications such as Microsoft® Outlook®, Outlook® Web App, Mobile Outlook®, Hotmail®, Outlook.com, and Gmail, SMS messaging applications, Instant Messaging (IM) applications, social media applications, Websites, as well as any other application including an input field to enter data and capable of facilitating sharing of content, communication, collaboration, conversations, and the like.

In one example, the primary application 110, the keyboard utility 120, and the secondary application 130 may be implemented as a user interface component. For example, any of the primary application 110, the keyboard utility 120, and the secondary application 130 may be rendered and/or displayed on a user interface of the client computing device 100. In one case, the user interface component may be a touchable user interface that is capable of receiving input via contact with a screen of the client computing device 100, thereby functioning as both an input device and an output device. For example, content may be displayed, or output, on the screen of the client computing device 100 and input may be received by contacting the screen using a stylus or by direct physical contact of a user, e.g., touching the screen. Contact may include, for instance, tapping the screen, using gestures such as swiping or pinching the screen, sketching on the screen, etc.

In another example, the user interface component may be a non-touch user interface. In one case, a tablet device, for example, may be utilized as a non-touch device when it is docked at a docking station (e.g., the tablet device may include a non-touch user interface). In another case, a desktop computer may include a non-touch user interface. In this example, the non-touchable user interface may be capable of receiving input via contact with a screen of the client computing device 100, thereby functioning as both an input device and an output device. For example, content may be displayed, or output, on the screen of the client computing device 100 and input may be received by contacting the screen using a cursor, for example. In this regard, contact may include, for example, placing a cursor on the non-touchable user interface using a device such as a mouse.

In some cases, the client computing device 100 and/or the primary application 110 may include and/or have associated with it a standard keyboard application, a voice typing keyboard application, a Swype keyboard application, and/or any other conventional/standard keyboard application. Each of these conventional/standard keyboard applications may be used to input textual data into the primary application 110. For example, each of these keyboard applications may be used to enter a message (e.g., a text message and/or an email message) into the primary application 110. In other examples, each of these conventional/standard keyboard applications may provide access to a secondary application. For example, a user may select an emoji button on the conventional/standard keyboard application to enter emoji icons into the primary application 110. In another example, a user may select an attach button on the conventional/standard keyboard to open and/or activate a variety of secondary applications for accessing data associated with the secondary applications.

In some aspects, the primary application 110 may be in communication with the keyboard utility 120. For example, the keyboard utility 120 may be used to input data into the primary application 110. In one example, the data may be input to an input field of the primary application 110. In some cases, the keyboard utility 120 is a generated view of information associated with the secondary application 130. In this regard, the generated view may be displayed as the keyboard utility 120. For example, the keyboard utility 120 may include information associated with the secondary application 130. The information associated with the secondary application 130 may include any functions, features, elements, components, etc., of the secondary application 130. In this regard, the keyboard utility 120 may include functionality of both the secondary application 130 and a keyboard application (e.g., the keyboard utility 120 may be used to input data into the primary application 110).

In aspects, the keyboard utility 120 may be linked to the secondary application 130. In one case, the information associated with the secondary application 130 that is included in the keyboard utility 120 may be the same as and/or similar to the information (e.g., the functions, features, elements, component, etc.) of the secondary application 130. For example, if the secondary application 130 has a component for scheduling a meeting, the keyboard utility 120 may include the same or a similar component for scheduling a meeting. In one example, the keyboard utility 120 may facilitate scheduling a meeting while the secondary application 130 facilitates viewing the scheduled meetings. In another case, in response to receiving at least one input on the keyboard utility 120, data associated with the secondary application 130 may be generated. For example, when the secondary application 130 is a calendar application, the input received on the keyboard utility 120 may include a selection of a date and time. In this example, the keyboard utility 120 may generate an event including the selected date and time.

In some cases, the generated data may be inputted/inserted into the primary application 110. Using the example described above herein, the generated event including the selected date and time from the keyboard utility 120 may be inputted/inserted into the primary application 110. In this regard, the generated data input into the primary application 110 may be in the form of a formatted date and time (e.g., Fri, October 16 at 10:30 AM). In some aspects, the generated data includes a selectable link. As such, the selectable link may be inputted/inserted into the primary application 110. In some examples, the secondary application 130 may be dynamically updated with the generated data based on the at least one input on the keyboard utility 120. Using the example described above herein, the secondary application 130 may be dynamically updated with the generated event including the selected date and time from the keyboard utility 120. In other examples, the keyboard utility 120 may be dynamically updated with the generated data based on the at least one input on the keyboard utility 120. Using the same example described above herein, the keyboard utility 120 may be dynamically updated with the generated event including the selected date and time from the keyboard utility 120. In one example, linking the keyboard utility 120 to the secondary application 130 may facilitate dynamically updating the keyboard utility 120 when a change, modification, update, etc., is made to the secondary application 130. In another example, linking the keyboard utility 120 to the secondary application 130 may facilitate dynamically updating the secondary application 130 when a change, modification, update, etc., is made to the keyboard utility 120. In yet another example, linking the keyboard utility 120 to the secondary application 130 may allow a user to directly input data associated with the secondary application 130 into the primary application 110 without opening and/or activating the secondary application 130. In turn, copy and paste operations from the secondary application 130 into the primary application 110 may be reduced, switching between and inputting data from a large number of applications into an input field of the primary application 110 may be reduced, efficient interaction with the user interface of a computing device (e.g., efficient interaction with the primary application 110, the keyboard utility 120, and/or the secondary application 130) may be achieved. As such, fewer computations may be required by a client and/or server computing device implementing the keyboard utility 120 of the present disclosure.

In one case, the secondary application 130 may be a calendar application, aspects of which will be described below relative to FIGS. 2B and 3. In other cases, the secondary application 130 may be any application or collection of applications, module or collection of modules, service or services, or any variation or combination thereof capable of being implemented on the client computing device 100 and linked to the keyboard utility 120. Examples of the secondary application 130 include, but are not limited to, applications for calendars, contacts, notetaking, photos/images/videos, stocks and finances, sports, schedules, application stores, weather information, news, social media, transit directions, music, communication (e.g., email, messaging, etc.), maps, shopping, airlines, tasks, games, as well as any other application including capable of being implemented on the client computing device 100, linked to the keyboard utility 120, and including data for inputting into the primary application 110.

Figure 2A:
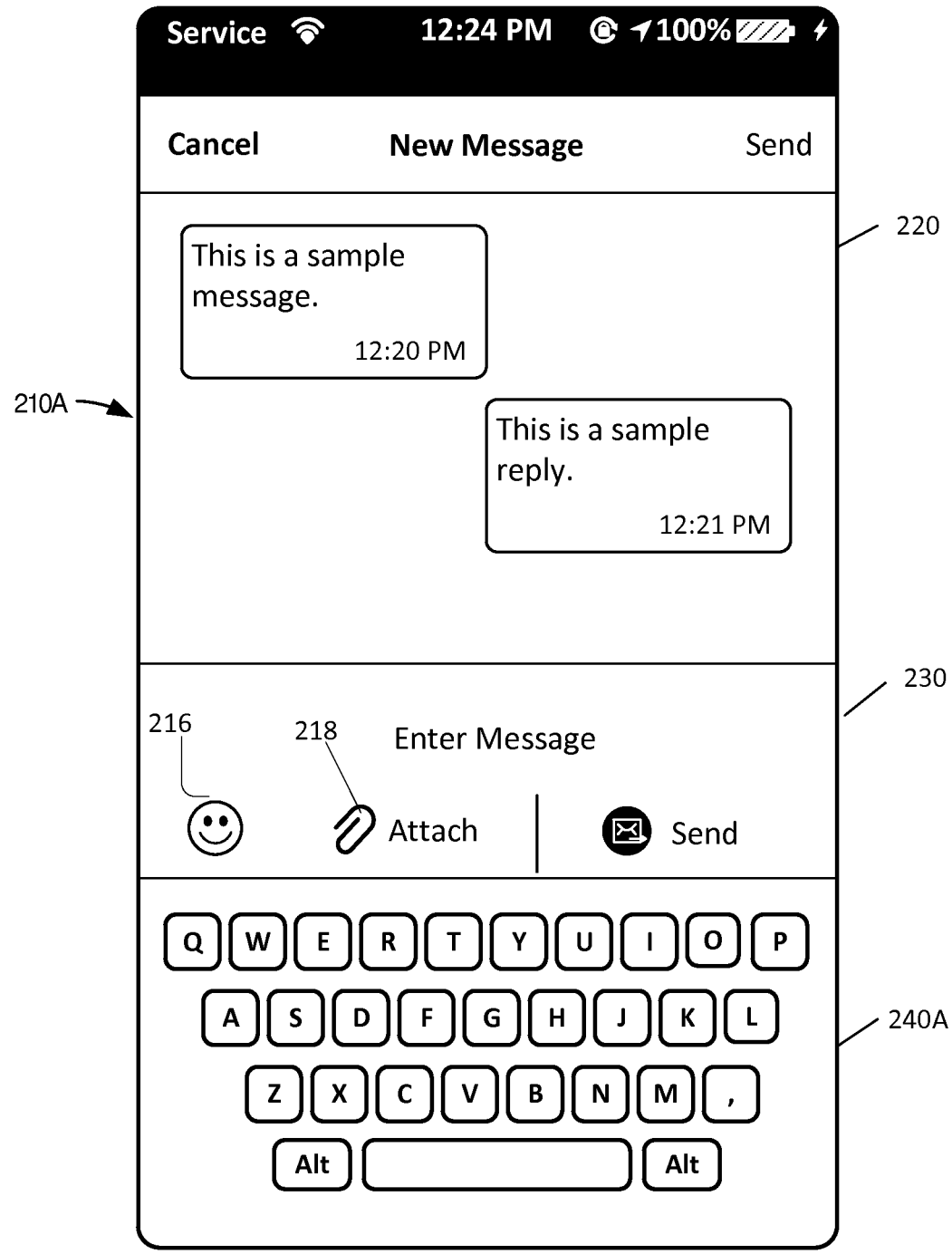
FIG. 2A illustrates one view of a primary application, according to an example aspect.

FIG. 2A illustrates one view 210A of a primary application 200, according to an exemplary aspect of the present disclosure. In aspects, the view 210A is one example of a view a user may encounter when interacting with the primary application 200. The view 210A may be rendered within the primary application 200 upon a selection of the primary application 200. As discussed above, the primary application 200 may be a mobile application, and may be any application or collection of applications, module or collection of modules, service or services, or any variation or combination thereof capable of facilitating sharing of content, communication, collaboration, conversations, and the like. In the example illustrated in FIG. 2A, the primary application 200 is a SMS text messaging application. In aspects, the primary application 200 may be implemented on a client computing device (e.g., such as the client computing device 100 illustrated in FIG. 1 and/or the client computing device illustrated in FIG. 6).

In one example, the view 210A and/or the primary application 200 may include a messaging interface 220, an input field 230, and a conventional/standard keyboard application 240A. The messaging interface 220 may include a portion of the primary application 200 for identifying recipients of a message/communication and/or information, and for displaying data/information associated with the primary application 200. For example, the messaging interface 220, as illustrated in FIG. 2A, includes a display of text messages between two people. The input field 230 may include a portion of the primary application 200 for inserting/entering/inputting data into the primary application 200. For example, the input field 230, as illustrated in FIG. 2A, may be used for inserting textual data for sending a message via the primary application 200. The conventional/standard keyboard application 240A may include a standard keyboard application, a voice typing keyboard application, a Swype keyboard application, and/or any other conventional/standard keyboard application. The conventional/standard keyboard application 240A may be used to input textual data into the input field 230 of the primary application 200. For example, the conventional/standard keyboard application 240A, as illustrated in FIG. 2A, may be used to input a message (e.g., a text message) into the input field 230 of the primary application 200.

In other examples, as discussed above, the conventional/standard keyboard application 240A may provide access to a secondary application. For example, a user may select an emoji button 216 to enter emoji icons into the input field 230 of the primary application 200. In another example, a user may select an attach button 218 to open and/or activate a separate screen that may include a variety of secondary applications for accessing data associated with the secondary applications (not illustrated). It may be appreciated that the features described herein relative to FIG. 2A are known to those skilled in the art.

Figure 2B:
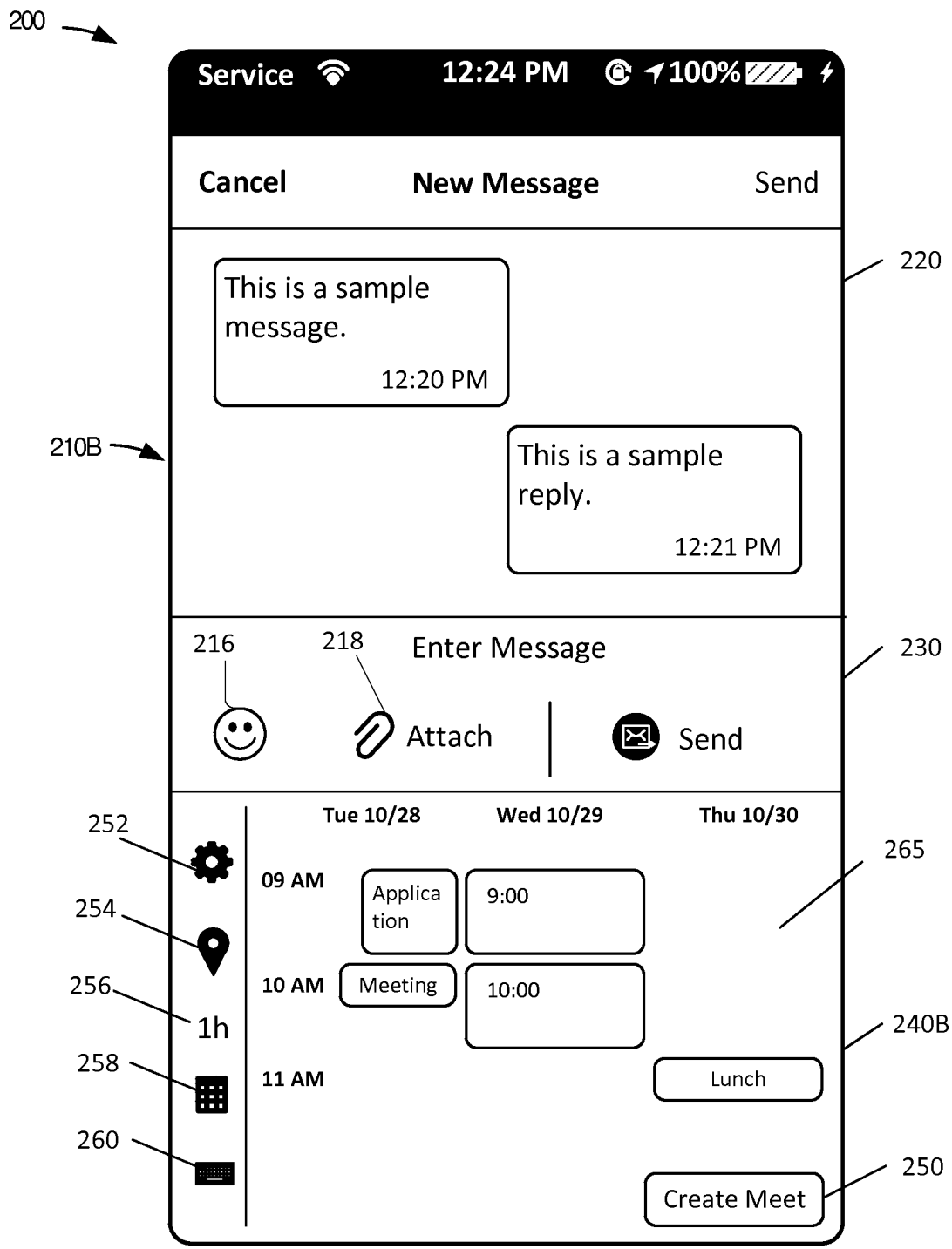
FIG. 2B illustrates another view of the primary application of FIG. 2A, according to an example aspect.

FIG. 2B illustrates another view 210B of the primary application 200. The view 210B of the primary application 200 is another example of a view a user may encounter when interacting with the primary application 200. The view 210B may be rendered within the primary application 200 upon a selection of the primary application 200. In one example, similar to the view 210A of the primary application 200, the view 210B may include the messaging interface 220, the input field 230, the emoji button 216, and the attach button 218. In aspects, the view 210B may further include a keyboard utility 240B. Similar to the keyboard utility 120 discussed above herein, the keyboard utility 240B may be used to input data into the input field 230 of the primary application 200. In some cases, the keyboard utility 240B is a generated view of information associated with a secondary application. In this regard, the generated view may be displayed as the keyboard utility 240B. For example, the keyboard utility 240B may include information associated with a secondary application. The information associated with the secondary application may include any functions, features, elements, components, etc., of the secondary application. In this regard, the keyboard utility 240B may include functionality of both a secondary application and a keyboard application (e.g., a keyboard application such as conventional/standard keyboard application 240A illustrated in FIG. 2A).

In an aspect illustrated in FIG. 2B, the keyboard utility 240B is a generated view of information associated with a calendar application. The calendar application may be any calendar application locally installed on a client computing device (e.g., the client computing device 100 illustrated in FIG. 1 and/or the client computing device illustrated in FIG. 6), or any calendar application from a plurality of sources including calendar applications associated with other secondary applications such as email applications, external websites, and the like. In this regard, the keyboard utility 240B includes information associated with the calendar application. The information associated with the secondary application may include any functions, features, elements, components, etc., of the calendar application. For example, the keyboard utility 240B includes a create meet icon 250, a calendar schedule 265, a settings icon 252, a location icon 254, a time duration icon 256, a keyboard utility icon 258, and a conventional/standard keyboard application icon 260.

In aspects, the calendar schedule 265 may include scheduled meetings, appointments, events, date and time information, and the like, associated with the calendar application. In this regard, a user may view her calendar schedule on the keyboard utility 240B to determine when she is free for scheduling an event, meeting, appointment, and the like. In aspects, the keyboard utility 240B may be linked to the calendar application. In this regard, the scheduled meetings, appointments, events, date and time information, and the like, shown in the calendar schedule 265 of the keyboard utility 240B may be similar to and/or the same as the calendar schedule of the calendar application (e.g., a secondary application) linked to the keyboard utility 240B. In some cases, the calendar schedule 265 may be expanded to show additional information. In one example, the additional information may include all-day events. In this regard, a user may expand the keyboard utility 240B and/or the calendar schedule 265 to see all-day events. In one example, a user may expand the keyboard utility 240B and/or the calendar schedule 265 to view additional information by selecting an icon (not illustrated).

As discussed above herein, in response to receiving at least one input on the keyboard utility 240B, data associated with the calendar application may be generated. The generated data will be described in more detail below relative to FIG. 3. In some examples, the at least one input may include receiving a selection of one or more icons and/or any information displayed as the keyboard utility 240B. In some cases, the at least one input and/or selection may include contacting the screen using a stylus or by direct physical contact of a user, e.g., touching the screen. Contact may include, for instance, tapping the screen, using gestures such as swiping or pinching the screen, sketching on the screen, etc. In one example, any of the create meet icon 250, the information associated with the calendar schedule 265, the settings icon 252, the location icon 254, the time duration icon 256, the keyboard utility icon 258, and the conventional/standard keyboard application icon 260 may be selected on the keyboard utility 240B.

In aspects, the settings icon 252 may provide settings information associated with the keyboard utility 240B. In some cases, the settings information may include secondary applications and/or primary applications to link to the keyboard utility 240B. For example, when the secondary application is a calendar application, as illustrated in FIG. 2B, upon a selection of the settings icon 252, the keyboard utility 240B may display various calendar applications and/or email applications that may have associated calendar applications for linking to the keyboard utility 240B. In other examples, the settings information may include functional and/or aesthetic settings associated with the keyboard utility 240B. For example, the settings information may include various display features such as the way the keyboard utility 240B is displayed with respect to the primary application 200 and/or how various features, icons, and/or information associated with the keyboard utility 240B are displayed.

In aspects, the location icon 254 may provide location information. For example, upon selection of the location icon 254, a mapping application and/or any other location based application, may be displayed within the keyboard utility 240B. In this regard, in one example, when a user wants to schedule an event, meeting, appointment, etc., using the keyboard utility 240B, the user may select a location for the event, meeting, appointment, etc., by selecting the location icon 254. In some cases, the mapping application and/or other location based application, may allow a user to search for and identify a specific location. In other cases, the mapping application and/or other location based application, may allow a user to enter a specific location. In another example, the location icon 254 may provide time zone information. For example, upon selection of the location icon 254, a time zone application may be displayed within the keyboard utility 240B. In this regard, a user may select a time zone for displaying the calendar schedule 265. As such, in response to a selection of the time zone, the calendar schedule 265 may be displayed in the selected time zone. In some cases, the calendar schedule 265 is displayed in a time zone associated with the client computing device.

In aspects, the time duration icon 256 may provide a plurality of options for selecting the duration of a scheduled event, meeting, appointment, etc. For example, upon selection of the time duration icon 256, a plurality of time duration options may be displayed within the keyboard utility 240B. In some cases, the plurality of time duration options may include time duration options in 30 minutes increments. For example, the plurality of time duration options may include 30 minutes, 1 hour, 1 hour and 30 minutes, 2 hours, etc. In other cases, the plurality of time duration options may include five minute increments. It is appreciated that any number of time duration options may be displayed and any number of time increments may be implemented. In some cases, the plurality of time duration options may be automatically updated based on a user's history. For example, if a default list includes 30 minutes, 1 hour, 1 hour and 30 minutes, 2 hours and a user most often schedules meetings with a time duration of 45 minutes, the least used time duration option in the default list may be automatically removed such that the time duration option of 45 minutes is included in the default list.

In aspects, the keyboard utility icon 258 may provide an indication that the calendar schedule 265 is displayed. For example, while the generated view of information associated with the calendar application is displayed as the keyboard utility 240B, the keyboard utility icon 258 may be highlighted. In other cases, the keyboard utility icon 258 may facilitate switching between the calendar schedule 265 and the displayed views associated with selecting the setting icon 252, the location icon 254, and the time duration icon 256. For example, after a user has selected the location icon 254, for example, and a mapping application and/or any other location based application is displayed, the user may select the keyboard utility icon 258 to get back to the calendar schedule 265. In aspects, the conventional/standard keyboard application icon 260 may provide access to the conventional/standard keyboard application 240A illustrated in FIG. 2A. For example, upon selection of the conventional/standard keyboard application icon 260, the keyboard utility 240B may be replaced by the conventional/standard keyboard application 240A. In this regard, the view 210A of the primary application 200 may be displayed.

In aspects, the create meet icon 250 may generate and/or process data associated with the calendar application based on the at least one input received on the keyboard utility 240B. The data generated may include any data based on the at least one input received on the keyboard utility 240B. For example, a user may schedule an event by providing an input to/selection of the calendar schedule 265. The user may specify the settings information, location information, and time duration information desired for the scheduled event by selecting each of the settings icon 252, location icon 254, and time duration icon 256. In this example, upon receiving a selection of the create meet icon 250, the data generated may include the event with the settings, location, time zone, date, and time duration information. In one case, the create meet icon 250 may generate and/or process data associated with the calendar application without receiving at least one input on the keyboard utility 240B. For example, the data generated may be based on the keyboard utility 240B automatically providing a scheduled event. In one example, the automatically generated/provided scheduled even may include settings information, location information, and time duration information. In one case, the scheduled event may be automatically provided based on default settings and/or calendar availability. As such, a user may create an event by selecting the create meet icon 250 without having to provide a selection on the calendar schedule 265. In other examples, the create meet icon 250 may input the generated data into the input field 230 of the primary application 200, which will be described in more detail below relative to FIG. 3.

In some aspects, as illustrated in FIG. 2B, the generated view of information associated with the calendar application displayed as the keyboard utility 240B partially overlaps the primary application 200. In this regard, both the primary application 200 and the keyboard utility 240B are simultaneously viewable on a client computing device (e.g., the client computing device 100 illustrated in FIG. 1 and/or the client computing device illustrated in FIG. 6). As such, a user may interact with and/or view the keyboard utility 240B while utilizing the primary application 200. As discussed above, the conventional/standard keyboard application icon 260 may provide access to the conventional/standard keyboard application 240A illustrated in FIG. 2A. In some cases, a user can switch between the conventional/standard keyboard application 240A and the keyboard utility 240B by swiping either of the conventional/standard keyboard application 240A or the keyboard utility 240B. In some cases, both the conventional/standard keyboard application 240A and the keyboard utility 240B may be displayed simultaneously on a user interface of a client computing device (not illustrated). By displaying the primary application 200 and the keyboard utility 240B on the user interface such that a user may view and/or interact with both the primary application 200 and the keyboard utility 240B simultaneously, a user may directly input data associated with the calendar application (e.g., a secondary application) into the primary application 200 without opening and/or activating the calendar application.

It is appreciated that while FIG. 2B illustrates a create meet icon 250, a calendar schedule 265, a settings icon 252, a location icon 254, a time duration icon 256, a keyboard utility icon 258, and a conventional/standard keyboard application icon 260 of the keyboard utility 240B, the discussion of the keyboard utility 240B, the create meet icon 250, the calendar schedule 265, the settings icon 252, the location icon 254, the time duration icon 256, the keyboard utility icon 258, and the conventional/standard keyboard application icon 260 is exemplary only and should not be considered as limiting.

Figure 3:
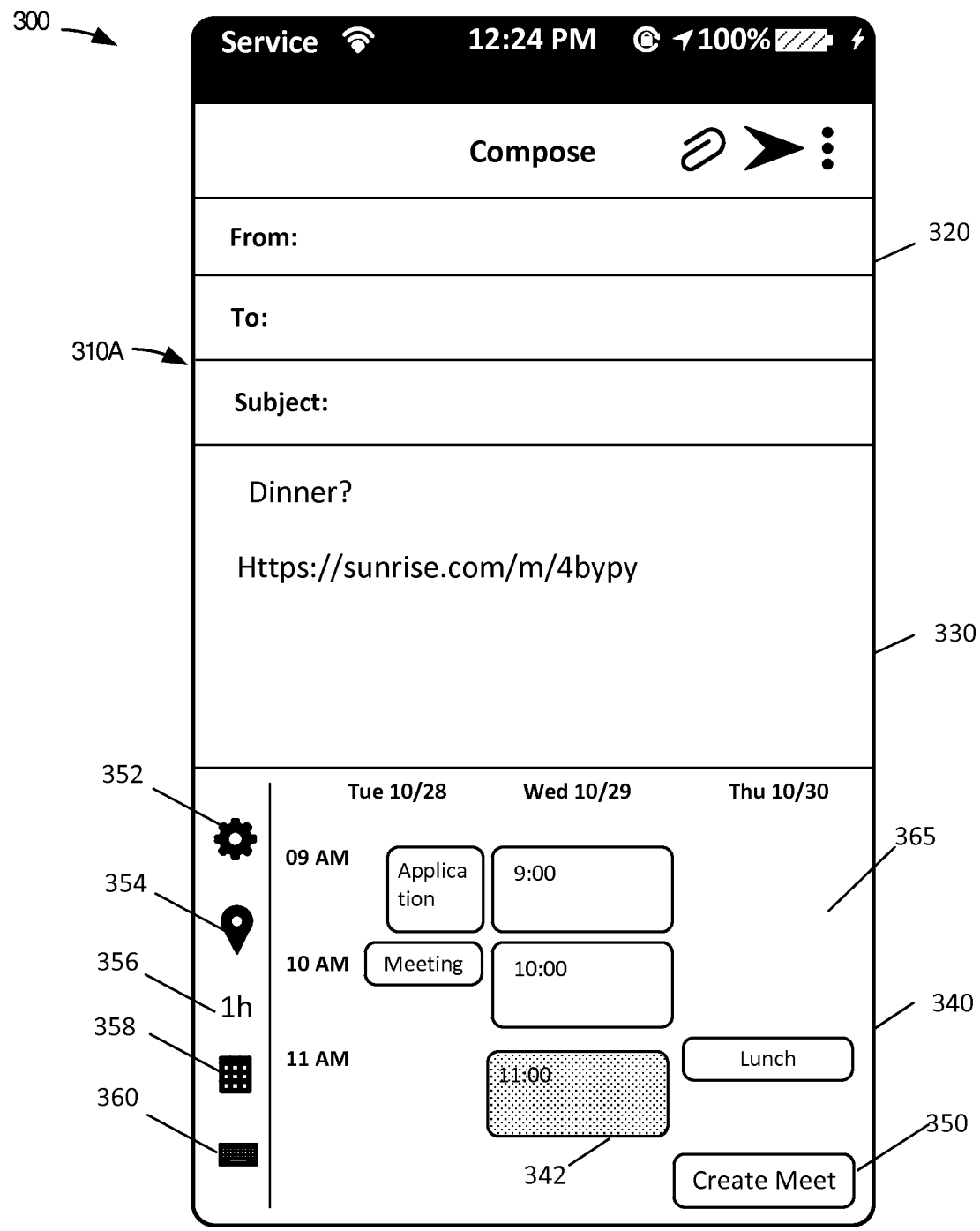
FIG. 3 illustrates one view of a primary application, according to an example aspect.

FIG. 3 illustrates one view 310A of a primary application 300, according to an exemplary aspect of the present disclosure. In aspects, the view 310A is one example of a view a user may encounter when interacting with the primary application 300. The view 310A may be rendered within the primary application 300 upon a selection of the primary application 300. As discussed above, the primary application 300 may be a mobile application, and may be any application or collection of applications, module or collection of modules, service or services, or any variation or combination thereof capable of facilitating sharing of content, communication, collaboration, conversations, and the like. In the example illustrated in FIG. 3, the primary application 300 is an email application. In aspects, the primary application 300 may be implemented on a client computing device (e.g., such as the client computing device 100 illustrated in FIG. 1 and/or the client computing device illustrated in FIG. 6).

In one example, the view 310A and/or the primary application 300 may include a messaging interface 320, an input field 330, and a keyboard utility 340. The messaging interface 320 may include a portion of the primary application 300 for identifying recipients of a message/communication and/or information, and for displaying data/information associated with the primary application 300. For example, the messaging interface 320, as illustrated in FIG. 3, includes a "From" field, a "To" field, and a "Subject" field. The input field 330 may include a portion of the primary application 300 for inserting/entering/inputting data into the primary application 300. For example, the input field 330, as illustrated in FIG. 3, may be used for inputting data for sending an email message via the primary application 300. As shown in FIG. 3, the input field 330 includes the message, "Dinner?" and a link, "https://sunrise.am/m/4bypy". In one example, the message, "Dinner?" may have been input into the input field 330 by using a conventional/standard keyboard application such as the conventional/standard keyboard application 240A illustrated in FIG. 2A. In another example, the link, "https://sunrise.am/m/4bypy" may have been input into the input field 330 by using the keyboard utility 340.

In some cases, the keyboard utility 340 is a generated view of information associated with a secondary application. In this regard, the generated view may be displayed as the keyboard utility 340. Similar to the keyboard utility 240B illustrated in FIG. 2B, the keyboard utility 340 is a generated view of information associated with a calendar application. The calendar application may be any calendar application locally installed on a client computing device (e.g., the client computing device 100 illustrated in FIG. 1 and/or the client computing device illustrated in FIG. 6), or any calendar application from a plurality of sources including calendar applications associated with other secondary applications such as email applications, external websites, and the like. In this regard, the keyboard utility 340 includes information associated with the calendar application. Similar to the keyboard utility 240B illustrated in FIG. 2B, the keyboard utility 340 includes a create meet icon 350, a calendar schedule 365, a settings icon 352, a location icon 354, a time duration icon 356, a keyboard utility icon 358, and a conventional/standard keyboard application icon 360. The keyboard utility 340, the create meet icon 350, the calendar schedule 365, the settings icon 352, the location icon 354, the time duration icon 356, the keyboard utility icon 358, and the conventional/standard keyboard application icon 360 may include all the functionality of the of the keyboard utility 240B, the create meet icon 250, the calendar schedule 265, the settings icon 252, the location icon 254, the time duration icon 256, the keyboard utility icon 258, and the conventional/standard keyboard application icon 260 as described herein.

As discussed herein, in response to receiving at least one input on the keyboard utility 340, data associated with the calendar application (e.g., a secondary application) may be generated. For example, as illustrated in FIG. 3, a selection of a date (e.g., Wed October 29) and a time (e.g., 11:00 AM) 342 is received on the keyboard utility 340. In some cases, other selections may be received on the keyboard utility 340 and associated with the selection 342 such as settings, location, and/or time duration selections, for example. In this regard, data associated with the received selections may be generated. In one case, the data is generated when the create meet icon 350 is selected. In some examples, upon receiving a selection of the create meet icon 350, the generated data is input into the input field 330 of the primary application 300. In the example illustrated in FIG. 3, the generated data is a selectable link, "https://sunrise.am/m/4bypy". In some cases, the selectable link may include at least one of a date, a time, a location, and contact information.

In some examples, in response to receiving a selection of the selectable link, at least one of an event, meeting, appointment, etc. including the generated data associated with the calendar application is created. In this regard, the keyboard utility 340 may be updated to reflect the at least one of an event, meeting, appointment, etc. that is created. For example, the selection 342 displayed within the calendar schedule 365 may be at least one of an event, meeting, appointment, etc. that includes the generated data associated with the calendar application linked to the keyboard utility 340. In other examples, the calendar application linked to the keyboard utility 340 may also be updated to reflect the at least one of an event, meeting, appointment, etc. that is created (not illustrated). In this example, the calendar application (e.g., secondary application) linked to the keyboard utility 340 may be updated to include at least one of an event, meeting, appointment, etc., having a date of Wed October 29, a time of 11 AM, time duration of 1 HR, and any other generated data included in the created event, meeting, appointment, etc. (not illustrated). In other examples, a calendar application associated with the recipient of the communication (e.g., in this case, the email message) may be updated to reflect the at least one of an event, meeting, appointment, etc. that is created (not illustrated). For example, the recipient of the email message may select the link input into the input field 330 and confirm the created event, meeting, and/or appointment. Upon confirmation of the created event, the event may be created in a calendar associated with the recipient.

In aspects, as described herein, both the keyboard utility 340 and the calendar application (e.g., secondary application) linked to the keyboard utility 340 may be dynamically updated with a created event, appointment, meeting, etc., including the generated data based on the at least one input on the keyboard utility 340. Linking the keyboard utility 340 to the calendar application, as described herein, may allow a user to directly input data associated with the calendar application into the primary application 300 without opening and/or activating the calendar application. In turn, copy and paste operations from the calendar application into the primary application 300 may be reduced, switching between and inputting data from a large number of applications into an input field of the primary application 300 may be reduced, efficient interaction with the user interface of a computing device (e.g., efficient interaction with the primary application 300, the keyboard utility 340, and/or the calendar application) may be achieved. As such, fewer computations may be required by a client and/or server computing device implementing the keyboard utility 340 of the present disclosure.

It is appreciated that while FIG. 3 illustrates a create meet icon 350, a calendar schedule 365, a settings icon 352, a location icon 354, a time duration icon 356, a keyboard utility icon 358, and a conventional/standard keyboard application icon 360 of the keyboard utility 340, the discussion of the keyboard utility 340, the create meet icon 350, the calendar schedule 365, the settings icon 352, the location icon 354, the time duration icon 356, the keyboard utility icon 358, and the conventional/standard keyboard application icon 360 is exemplary only and should not be considered as limiting.

Figure 4:
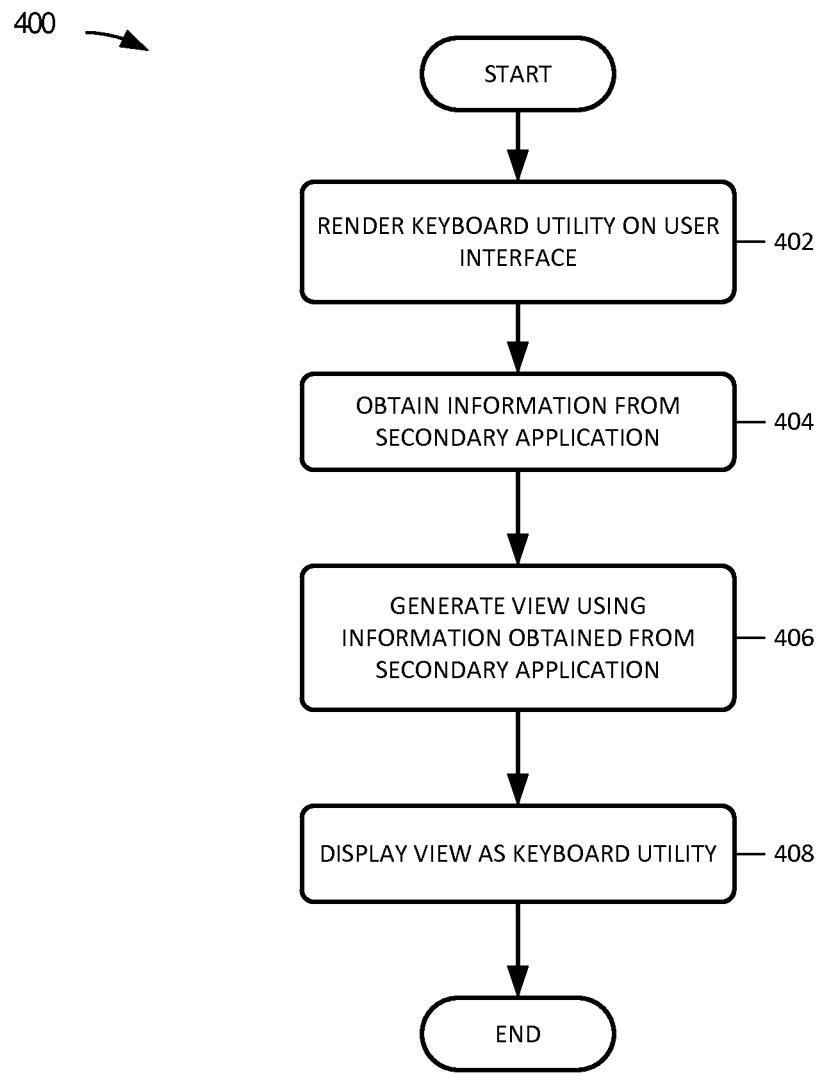
FIG. 4 illustrates an exemplary method for inputting data into a primary application, according to an example aspect.

Referring now to FIG. 4, an exemplary method 400 for inputting data into a primary application, according to an example aspect is shown. Method 400 may be implemented on a computing device or a similar electronic device capable of executing instructions through at least one processor. Method 400 may begin at operation 402, where rendering of a keyboard utility on a user interface of a client computing device is initiated. The keyboard utility may be linked to a secondary application. In some examples, the keyboard utility may be rendered on the user interface of the client computing device based on the secondary application. For example, the keyboard utility may be rendered based on the keyboard utility a user most uses with the primary application for which the user is inputting data. That is, a user may most often use a keyboard utility linked to a particular secondary application while inputting data into a particular primary application. In another example, the keyboard utility may be rendered based on predicting which keyboard utility (e.g., the keyboard utility linked to which secondary application) is the most useful for the primary application for which the user is inputting data. For example, as described herein, if a user is sending an email message where the text in the email message includes a suggested event, the predicted keyboard utility may be the keyboard utility linked to a calendar application. In this regard, a user may easily input a meeting request, for example, into the email message using the keyboard utility linked to the calendar application.

When rendering of the keyboard utility on the user interface is initiated, flow may proceed to operation 404 where information is obtained from a secondary application. In one example, the information is associated with the secondary application. The information associated with the secondary application may include any functions, features, elements, components, etc., of the secondary application. In this regard, the keyboard utility may include functionality of both the secondary application and a keyboard application (e.g., the keyboard utility may be used to input data into the primary application).

When the information is obtained from the secondary application, flow proceeds to operation 406 where a view is generated using the information obtained from the secondary application. In one example, the keyboard utility is a generated view of the information associated with the secondary application. In one example, the view may be generated based on at least one condition. A condition may include whether a context of a cursor in an input field of the primary application is at least empty or matches a previously saved context. For example, in some cases, a user may start a request for a meeting, for example, using the keyboard utility without completing the request (e.g., without selecting the create meet icon as discussed herein). In this case, the next time the keyboard utility is rendered, while generating a new view, the keyboard utility may compute a hash based on text before and after the cursor and determine whether the input field is at least empty or matches a previously saved context. The previously saved context may include text in the input field. For example, the text in the input field may be "Dinner?" and the previously saved context may be the computed hash for this text. As such, if the keyboard utility determines that the cursor is next to the text, "Dinner?" then it is determined that the context of the cursor matches a previously saved context. When the context of the cursor in the input field of the primary application is at least empty or matches a previously saved context, the generated view of information obtained from the secondary application may include the previously saved context. Otherwise, the generated view of information obtained from the secondary application may not include the previously saved context.

In another example, a condition may include whether an event, meeting, appointment, etc., has been created or modified within 10 minutes of a previously created draft event, meeting, appointment, etc. For example, as discussed above, a user may start creating a draft event using the keyboard utility without completing the request (e.g., without selecting the create meet icon as discussed herein). In this case, the next time the keyboard utility is rendered, while generating a new view, the keyboard utility may determine how much time has passed since the previously created draft event. If not more than 10 minutes has passed since the previously created draft event, the generated view of information obtained from the secondary application may include the draft event. Otherwise, the generated view of information obtained from the secondary application may not include the draft event. While the exemplary condition described herein includes whether an event, meeting, appointment, etc., has been created or modified within 10 minutes of a previously created draft event, meeting, appointment, etc., it is appreciated that the condition may include any amount of time (e.g., 5 minutes, 15 minutes, 20 minutes, 1 hour, etc.) that has passed since a previously created draft event. In one case, the view may be generated based on both conditions described above herein (e.g., both time and context).

When a view is generated using the information obtained from the secondary application, flow proceeds to operation 408 where the generated view is displayed as the keyboard utility on the user interface of the client computing device. In some cases, the view displayed as the keyboard utility partially overlaps the primary application on the user interface such that both the primary application and the view displayed as the keyboard utility are simultaneously viewable on the user interface. For example, while using the primary application, the primary application may occupy all the screen space on the user interface and the keyboard utility may be displayed on a lower portion of the user interface such that the keyboard utility overlaps a lower portion of the primary application. In this regard, a user may view and/or interact with both the primary application and the keyboard utility at the same time. In this regard, a user may directly input data associated with the secondary application into the primary application without opening and/or activating the secondary application.

Figure 5:
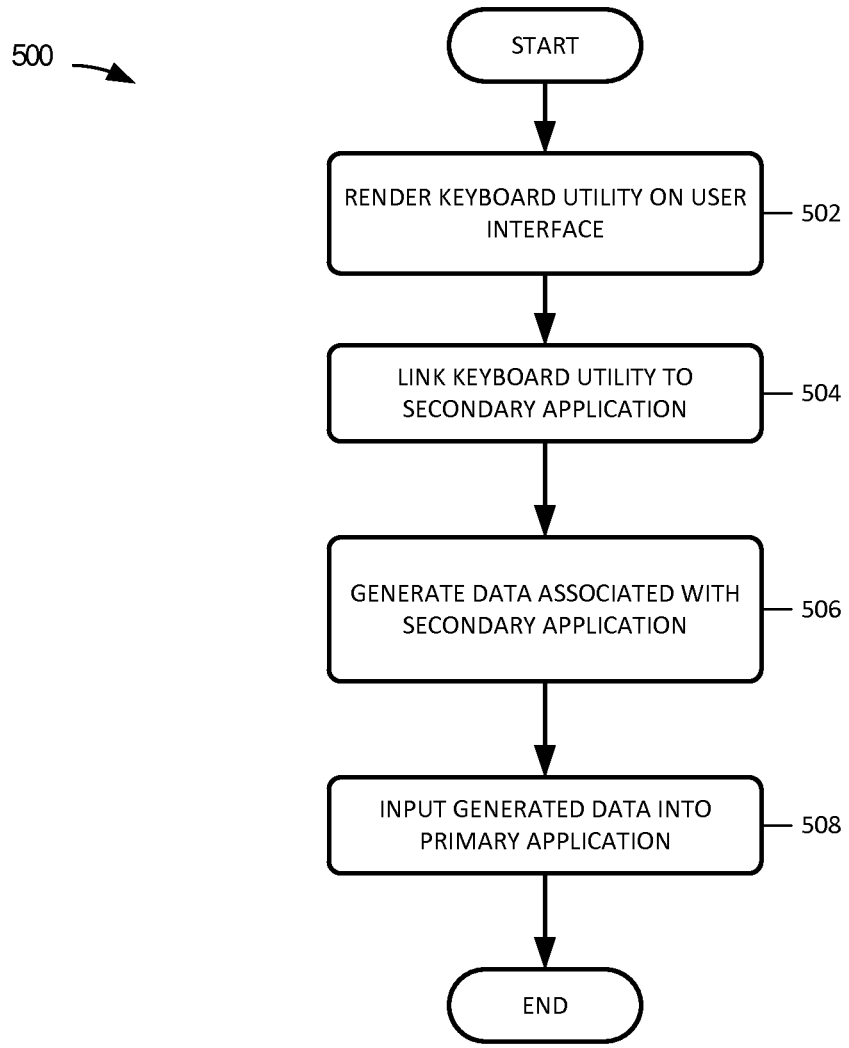
FIG. 5 illustrates an exemplary method for inputting data into a primary application, according to an example aspect.

Referring now to FIG. 5, an exemplary method 500 for inputting data into a primary application, according to an example aspect is shown. Method 500 may be implemented on a computing device or a similar electronic device capable of executing instructions through at least one processor. Method 500 may begin at operation 502, where rendering of a keyboard utility on a user interface of a client computing device is initiated. The keyboard utility may be linked to a secondary application. In some examples, the keyboard utility may be rendered on the user interface of the client computing device based on the secondary application. For example, the keyboard utility may include information associated with the secondary application. The information associated with the secondary application may include any functions, features, elements, components, etc., of the secondary application. In another example, the keyboard utility may be rendered based on the keyboard utility a user most uses with the primary application for which the user is inputting data. That is, a user may most often use a keyboard utility linked to a particular secondary application while inputting data into a particular primary application. In another example, the keyboard utility may be rendered based on predicting which keyboard utility (e.g., the keyboard utility linked to which secondary application) is the most useful for the primary application for which the user is inputting data. For example, as described herein, if a user is sending an email message where the text in the email message includes a suggested event, the predicted keyboard utility may be the keyboard utility linked to a calendar application. In this regard, a user may easily input a meeting request, for example, into the email message using the keyboard utility linked to the calendar application.

When rendering of the keyboard utility on the user interface is initiated, flow may proceed to operation 504 where the keyboard utility is linked to a secondary application. In one example, the keyboard utility is a generated view of information associated with the secondary application. In some cases, linking the keyboard utility to the secondary application may facilitate dynamically updating the generated view of information associated with the secondary application. For example, when a user makes a change, modification, update, etc., to the secondary application, the change, modification, update, etc., may be reflected in the keyboard utility. That is, the keyboard utility (e.g., the generated view of information associated with the secondary application) may be dynamically updated to include the change, modification, update, etc., made to the secondary application.

In response to receiving at least one input on the keyboard utility, flow proceeds to operation 506 where data associated with the secondary application is generated. For example, when the secondary application is a calendar application, the data generated may include any data associated with scheduling meetings, event, appointments, and the like. In one example, the generated data may include data such as date, time, location, contacts, and the like. As such, when the at least one input received on the keyboard utility includes a selection of a date and time, an event including the selected date and time may be generated.

When data associated with the secondary application is generated, flow proceeds to operation 508 where the generated data is input into the primary application. In one example, the generated data may be input into an input field of the primary application. In one case, the generated data may be input into the primary application when an icon displayed within the keyboard utility is selected. In one example, the icon may be a create meet icon. In the example where an event including a date and time is generated, the generated event including the selected date and time from the keyboard utility may be input into the primary application. In some aspects, the generated data includes a selectable link (e.g., a Uniform Resource Locator). As such, the selectable link may be input into the primary application. In other aspects, the generated data is in the form of a formatted date and time (e.g., Fri, October 16 at 10:30 AM). As such, the formatted date and time may be input into the primary application.

The term rendering as used herein generally refers to the various capabilities employed in various computing architectures to assemble information that can then be used by other capabilities to generate an image or images. Within the context of methods 400 and 500, for example, rendering a keyboard utility, for example, generally refers to assembling the information or data used to generate an image or images that together result in the keyboard utility. Animation or other dynamics may also be used to achieve certain effects.

However, it may be appreciated that other perspectives on rendering may be considered within the scope of the present disclosure. For example, rendering as used herein may also, in some scenarios, be considered to refer to the various capabilities employed by various computing architectures to generate an image or images from information assembled for that purpose. With respect to the methods 400 and 500, rendering a keyboard utility may refer to generating an image or images, from information assembled for that purpose, that together result in the keyboard utility, which can then be displayed.

It may also be appreciated that rendering in some scenarios may refer to a combination of the aforementioned possibilities. For example, rendering in some scenarios may refer to both assembling the information used to generate an image or images for a keyboard utility and then generating the image or images of the keyboard utility. In addition, a wide variety of other steps, processes, and stages may occur within the context of presenting views of an application, all of which may be considered part of presenting a view. Thus, yet one other variation on methods 400 and 500 includes, but is not limited to, initiating the presentation of a keyboard utility.

Figure 6:
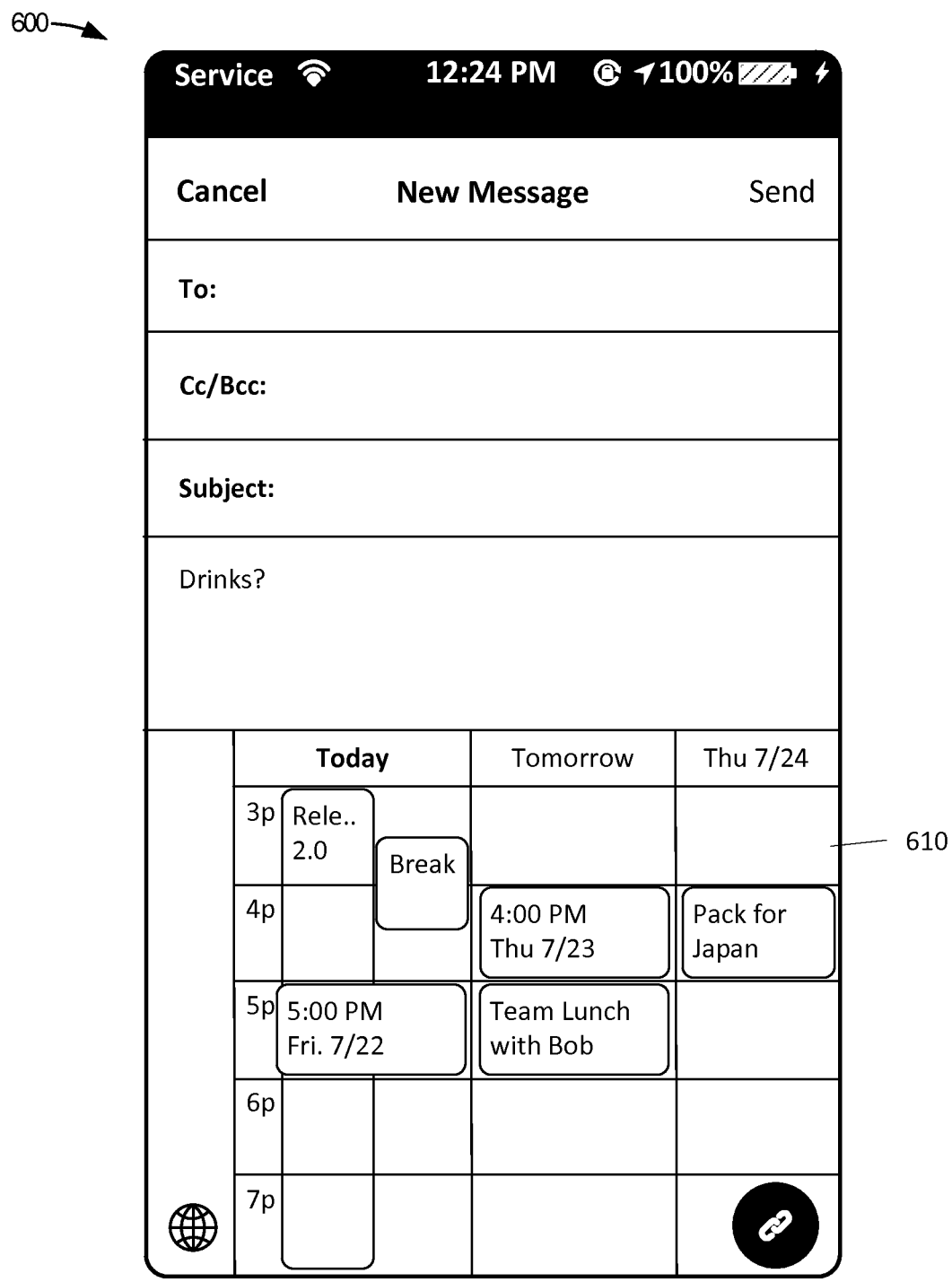
FIG. 6 is a screenshot diagram of a dynamic input module, according to an aspect.
Figure 7:
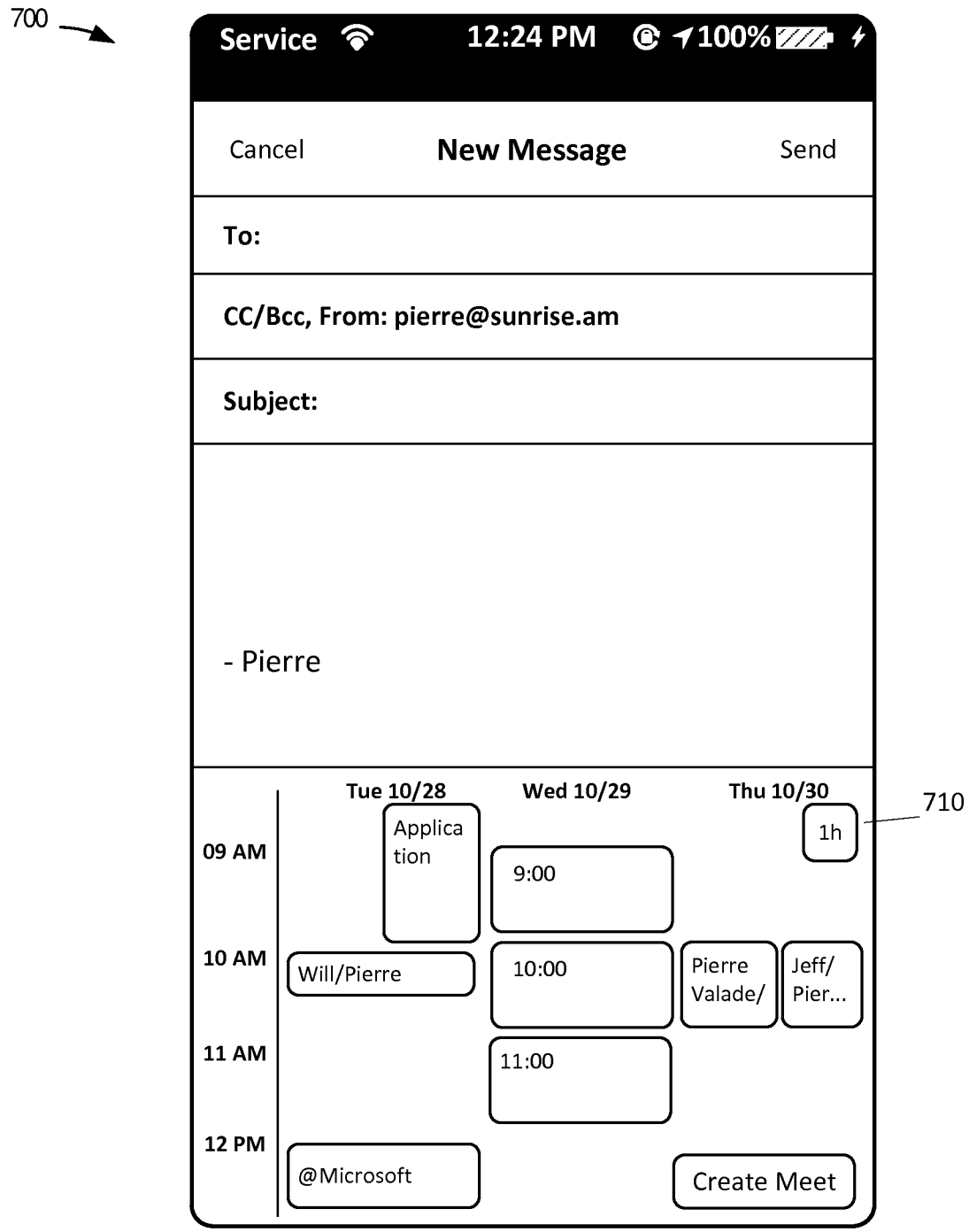
FIG. 7 is a screenshot diagram of a dynamic input module, according to an aspect.

FIGS. 6 and 7 are screenshot diagrams (600, 700) of a dynamic input module, according to aspects. It is appreciated that the dynamic input module may be referred to as the keyboard utility, as described herein, and that the keyboard utility may be referred to as the dynamic input module (e.g., a calendar dynamic input module), as described herein. In some aspects, a user can be provided with at least one dynamic input module 610, e.g., in addition to a keyboard applet, which can allow the user to input different types of textual and/or non-textual data into input fields (e.g., email messages, SMS messages, instant messaging (IM) messages, social media postings, web forms, and/or the like) on the mobile device. For example, if a user is creating an email message to another user (e.g., in an email application and/or website), the user can use a standard keyboard applet to enter the textual portion of the email message, and can also open a calendar dynamic input module 610 (see, e.g., the example user interface of FIG. 6) to view and/or provide calendar input to the user for use in creating a message. For example, the calendar dynamic input module 610 can show the user's current calendar schedule, such that the user can view when she is free to meet with the recipient of the message, without opening a separate calendar application and/or web page on the mobile device. The calendar shown in the calendar dynamic input module 610 can update dynamically as new appointments and/or meeting requests are made by and/or sent to the user.

The user can select the calendar dynamic input module 610 and/or switch between a standard keyboard applet and a number of dynamic input modules via swiping the current keyboard applet and/or dynamic input module 610 off the screen, by pressing a dynamic input module switching button, and/or a similar mechanism for switching between dynamic input modules. In some implementations the next dynamic input module can replace the current module the user has activated. In some implementations a user can view more than one dynamic input module 610 at once (e.g., the user can view both a keyboard applet and a calendar dynamic input module 610 on the same screen, where each occupies a portion of the space allocated for a full-sized keyboard applet and/or dynamic input module 610). In some implementations the dynamic input modules can be managed by a dynamic input module controller applet which can manage the dynamic input modules and/or keyboard applets accessible to the user, can manage obtaining information for each of the dynamic input modules, and/or the like. In some implementations the dynamic input module controller applet can automatically select a dynamic input module to show when the user opens a particular application, e.g., based on the dynamic input module the user most uses with the particular application, based on predicting which dynamic input module would be most useful for the particular application, and/or the like.

The calendar dynamic input module 610 can also allow the user to generate appointments, meeting requests, and/or the like (e.g., to add the appointment with the recipient to the user's calendar directly), and/or to incorporate generated appointments and/or meeting requests into the email message (e.g., to drag and drop an appointment with the recipient into the email). The calendar dynamic input module 610 can have the functionality of a calendaring application and/or software, without forcing the user to open a different application to access and/or modify the information in the user's calendar. Referring to FIG. 7, in some implementations, the calendar dynamic input module 710 can show the user calendars that are stored locally on the user device (e.g., calendars which have been made via the calendar dynamic input module, and/or another calendar application on the mobile device, and/or the like), and/or can input calendars from a variety of other sources (e.g., can import calendars associated with the email account the user has selected in the particular email application, from external websites, and/or the like).

Dynamic input modules can also provide other "live" (e.g., current) information in addition to calendar information. For example, dynamic input modules can allow users to view and/or interact with photos and/or similar media, stock ticker and/or other financial information, sports scores, schedules, and/or other sports-related information, application store information, current or predicted weather information, news articles and/or other news information, social media posts and/or similar social media data, transit directions, schedules, and/or like information, music information, emails and/or similar messages from messaging applications other than the application and/or website into which the user is currently inputting data, and/or other data which a user may wish to view and/or interact with in order to complete an input field. Thus, a user can use dynamic input modules to provide current and up-to-date data from several applications (e.g., a link to an application in the mobile device's application store, a link to a social media page, directions to a location derived from a map application, and/or the like) into an active application and/or website with an input field, without opening the other applications directly. This can reduce the resources used by the mobile device to provide the data to the user (e.g., because the user does not need to open multiple applications to obtain the information), can allow users to keep accounts and/or applications separate (e.g., can allow a user to provide calendar information from her calendar application into her email application, without giving permission to the email application to access all of the data in the calendar application), and/or the like.

Figure 8:
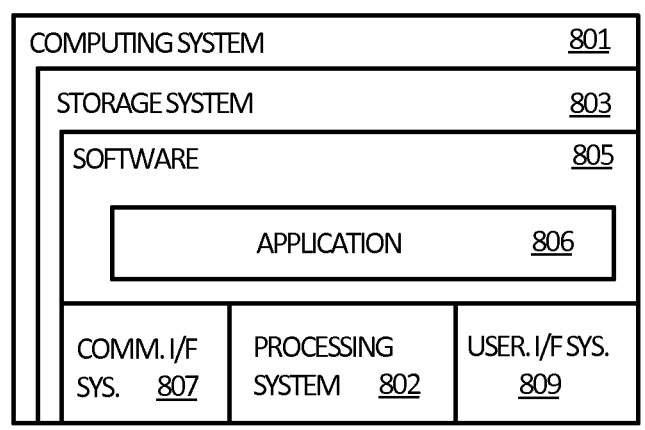
FIG. 8 illustrates a computing system suitable for implementing the enhanced keyboard technology disclosed herein, including any of the environments, architectures, elements, processes, user interfaces, and operational scenarios and sequences illustrated in the Figures and discussed below in the Technical Disclosure.

FIG. 8 illustrates computing system 801 that is representative of any system or collection of systems in which the various applications, services, scenarios, and processes disclosed herein may be implemented. Examples of computing system 801 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 801 may be implemented as a single apparatus, system, or device or may be implemented in a distributed manner as multiple apparatuses, systems, or devices. Computing system 801 includes, but is not limited to, processing system 802, storage system 803, software 805, communication interface system 807, and user interface system 809. Processing system 802 is operatively coupled with storage system 803, communication interface system 807, and user interface system 809.

Processing system 802 loads and executes software 805 from storage system 803. Software 805 includes application 806, which is representative of the applications discussed with respect to the preceding FIGS. 1-7, including primary applications 110, 200, and 300, keyboard utility 120, 240B, and 340, and secondary application 130. When executed by processing system 802 to enhance inputting data into a primary application, software 805 directs processing system 802 to operate as described herein for at least the various processes, operational scenarios, and sequences discussed in the foregoing implementations. Computing system 801 may optionally include additional devices, features, or functionality not discussed for purposes of brevity.

Referring still to FIG. 8, processing system 802 may comprise a micro-processor and other circuitry that retrieves and executes software 805 from storage system 803. Processing system 802 may be implemented within a single processing device, but may also be distributed across multiple processing devices or sub-systems that cooperate in executing program instructions. Examples of processing system 802 include general purpose central processing units, application specific processors, and logic devices, as well as any other type of processing device, combinations, or variations thereof.

Storage system 803 may comprise any computer readable storage media readable by processing system 802 and capable of storing software 805. Storage system 803 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 803 may also include computer readable communication media over which at least some of software 805 may be communicated internally or externally. Storage system 803 may be implemented as a single storage device, but may also be implemented across multiple storage devices or sub-systems co-located or distributed relative to each other. Storage system 803 may comprise additional elements, such as a controller, capable of communicating with processing system 802 or possibly other systems.

Software 805 may be implemented in program instructions and among other functions may, when executed by processing system 802, direct processing system 802 to operate as described with respect to the various operational scenarios, sequences, and processes illustrated herein. For example, software 805 may include program instructions for implementing enhanced keyboard utilities for inputting of data into a primary application.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 805 may include additional processes, programs, or components, such as operating system software, virtual machine software, or other application software, in addition to or that include application 806. Software 805 may also comprise firmware or some other form of machine-readable processing instructions executable by processing system 802.

In general, software 805 may, when loaded into processing system 802 and executed, transform a suitable apparatus, system, or device (of which computing system 801 is representative) overall from a general-purpose computing system into a special-purpose computing system customized to facilitate enhanced data input. Indeed, encoding software 805 on storage system 803 may transform the physical structure of storage system 803. The specific transformation of the physical structure may depend on various factors in different implementations of this description. Examples of such factors may include, but are not limited to, the technology used to implement the storage media of storage system 803 and whether the computer-storage media are characterized as primary or secondary storage, as well as other factors.

For example, if the computer readable storage media are implemented as semiconductor-based memory, software 805 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 807 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 809 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 809. In some cases, the input and output devices may be combined in a single device, such as a display capable of displaying images and receiving touch gestures. The aforementioned user input and output devices are well known in the art and need not be discussed at length here.

User interface system 809 may also include associated user interface software executable by processing system 802 in support of the various user input and output devices discussed above. Separately or in conjunction with each other and other hardware and software elements, the user interface software and user interface devices may support a graphical user interface, a natural user interface, or any other type of user interface.

Communication between computing system 801 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Techniques for differentiating a conversation scope within an email application are described. Although aspects are described in language specific to structural features and/or methodological acts, it is to be understood that the aspects defined in the appended claims are not necessarily limited to the specific features or acts described above. Rather, the specific features and acts are disclosed as example forms of implementing the claimed aspects.

A number of methods may be implemented to perform the techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods may be implemented via interaction between various entities discussed above with reference to the touchable user interface.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an aspect with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Additionally, while the aspects may be described in the general context of communication/messaging systems that execute in conjunction with an application program that runs on an operating system on a computing device, those skilled in the art will recognize that aspects may also be implemented in combination with other program modules. In further aspects, the aspects disclosed herein may be implemented in hardware.

Generally, program modules include routines, programs, components, data structures, and other types of structures that perform particular tasks or implement particular abstract data types. Moreover, those skilled in the art will appreciate that aspects may be practiced with other computer system configurations, including hand-held devices, multiprocessor systems, microprocessor-based or programmable consumer electronics, minicomputers, mainframe computers, and comparable computing devices. Aspects may also be practiced in distributed computing environments where tasks are performed by remote processing devices that are linked through a communications network. In a distributed computing environment, program modules may be located in both local and remote memory storage devices.

Aspects may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or compact servers, an application executed on a single computing device, and comparable systems.

What is claimed is:

1. A system comprising:
   one or more non-transitory computer readable storage media; and
   program instructions stored on the one or more non-transitory computer readable storage media for executing a keyboard utility that, when executed by at least one processor, cause the at least one processor to at least:
   initiate rendering, on a user interface of a client computing device, of the keyboard utility comprising a representation of information associated with a calendar application, wherein the keyboard utility is configured to receive the information from the calendar application and input, into a mobile application executing on the client computing device, data generated by the keyboard utility, and
      wherein the calendar application and the keyboard utility are distinct modules;
   responsive to linking the keyboard utility to the calendar application, dynamically obtain, via the keyboard utility, the information;

generate, via the keyboard utility, a view comprising a representation of the information;
in response to a selection of an icon:
generate, via the keyboard utility, the data including at least a selectable link comprising at least one of a date, a time, a location, and a time zone; and
input, via the keyboard utility and into the mobile application, the data;
generate, via the keyboard utility and based on the data, an updated view of the keyboard utility; and
display, on the user interface of the client computing device, the keyboard utility having the updated view therein.

2. The system of claim 1, wherein the program instructions, when executed by the at least one processor, further cause the at least one processor to link, in the client computing device, the keyboard utility to the calendar application.

3. The system of claim 1, wherein the keyboard utility partially overlaps the mobile application on the user interface such that both the mobile application and the keyboard utility are simultaneously viewable on the user interface of the client computing device.

4. The system of claim 1, wherein the program instructions, when executed by the at least one processor, cause the at least one processor to, dynamically determine, via the keyboard utility, an amount of screen space on the user interface to occupy.

5. The system of claim 1, wherein the program instructions, when executed by the at least one processor, further cause the at least one processor to input the data into the mobile application.

6. The system of claim 1, wherein to input the data, the program instructions, when executed by the at least one processor, further cause the at least one processor to input the data into an electronic communication of the mobile application.

7. The system of claim 6, wherein in response to a selection of the selectable link, the program instructions, when executed by the at least one processor, further cause the at least one processor to create an event in a calendar associated with a recipient of the electronic communication.

8. The system of claim 1, wherein in response to a selection of the selectable link, the program instructions, when executed by the at least one processor, further cause the at least one processor to update, based at least on the data, the calendar application.

9. A computer-implemented method comprising:
initiating rendering, on a user interface of a client computing device, of a keyboard utility configured to receive information from a secondary application and input, into a primary application, data generated by the keyboard utility, wherein the secondary application and the keyboard utility are distinct modules;
responsive to linking the keyboard utility to the secondary application, dynamically obtaining, via the keyboard utility, the information;
generating, via the keyboard utility, a view comprising a representation of the information;
in response to a selection of an icon:
generating, via the keyboard utility, the data including at least a selectable link comprising at least one of a date, a time, a location, and a time zone; and
inputting, via the keyboard utility and into the primary application, the data;
generating, via the keyboard utility and based on the data, an updated view of the keyboard utility; and
displaying, on the user interface of the client computing device, the keyboard utility having the updated view therein.

10. The computer-implemented method of claim 9, wherein the keyboard utility partially overlaps the primary application on the user interface such that both the primary application and the keyboard utility are simultaneously viewable on the user interface of the client computing device.

11. The computer-implemented method of claim 9 further comprising linking, in the client computing device, the keyboard utility to the secondary application.

12. The computer-implemented method of claim 9, further comprising inputting the data into the primary application.

13. The computer-implemented method of claim 9, further comprising dynamically updating, with the data, the secondary application.

14. The computer-implemented method of claim 13, wherein dynamically updating the secondary application is in response to a selection of the selectable link.

15. A computer-implemented method comprising:
initiating rendering, on a user interface of a client computing device, of a keyboard utility configured to receive information from a secondary application and input, into a primary application executing on the client computing device, data generated by the keyboard utility,
wherein the secondary application and the keyboard utility are distinct modules;
responsive to linking the keyboard utility to the secondary application, dynamically obtaining, via the keyboard utility, the information;
generating, via the keyboard utility, a view comprising a representation of the information;
in response to a selection of an icon:
generating, via the keyboard utility, the data including at least a selectable link comprising at least one of a date, a time, a location, and a time zone; and
inputting, via the keyboard utility and into the primary application, the data;
generating, via the keyboard utility and based on the data, an updated view of the keyboard utility; and
displaying, on the user interface of the client computing device, the keyboard utility having the updated view therein.

16. The computer-implemented method of claim 15, wherein the secondary application is a calendar application.

17. The computer-implemented method of claim 15, further comprising dynamically determining, via the keyboard utility, an amount of screen space on the user interface to occupy.

18. The computer-implemented method of claim 15, further comprising: linking the keyboard utility to the secondary application.

19. The computer-implemented method of claim 15, further comprising dynamically updating, with the data, the secondary application.

20. The computer-implemented method of claim 15, wherein initiating rendering of the keyboard utility on the user interface comprises displaying the keyboard utility to partially overlap the primary application on the user interface such that both the primary application and the keyboard utility are simultaneously viewable on the user interface.

* * * * *